US012643338B2

(12) United States Patent
Blesovsky et al.

(10) Patent No.: US 12,643,338 B2
(45) Date of Patent: Jun. 2, 2026

(54) POLYMERIC SECURITY ARTICLES

(71) Applicant: Koenig & Bauer Banknote Solutions SA, Lausanne (CH)

(72) Inventors: Michael Blesovsky, Burford (GB); Johannes Schaede, Würzburg (DE); Robert Stewart, La Tour de Peilz (CH)

(73) Assignee: Koenig & Bauer Banknote Solutions SA, Lausanne (CH)

( * ) Notice: Subject to any disclaimer, the term of this patent is extended or adjusted under 35 U.S.C. 154(b) by 1308 days.

(21) Appl. No.: 17/427,009

(22) PCT Filed: Jan. 30, 2019

(86) PCT No.: PCT/EP2019/052243

§ 371 (c)(1),
(2) Date: Jul. 29, 2021

(87) PCT Pub. No.: WO2020/156655

PCT Pub. Date: Aug. 6, 2020

(65) Prior Publication Data

US 2022/0144004 A1 May 12, 2022

(51) Int. Cl.
*B41M 3/14* (2006.01)
*B42D 25/29* (2014.01)

(52) U.S. Cl.
CPC ............... *B41M 3/14* (2013.01); *B42D 25/29* (2014.10)

(58) Field of Classification Search
CPC ........... B41M 3/14; B42D 25/29; B42D 25/36
USPC ........................................................ 428/32.18
See application file for complete search history.

(56) References Cited

U.S. PATENT DOCUMENTS

| | | | |
|---|---|---|---|
| 4,098,996 | A | 7/1978 | Ryan et al. |
| 4,190,194 | A | 2/1980 | Amero |
| 4,830,902 | A | 5/1989 | Plantenga et al. |
| 5,215,814 | A | 6/1993 | Gager et al. |
| 5,630,869 | A | 5/1997 | Amon et al. |
| 5,989,389 | A | 11/1999 | Sundberg |
| 6,968,783 | B2 | 11/2005 | Hug et al. |
| 6,979,480 | B1 | 12/2005 | Schulz et al. |
| 7,498,125 | B2 | 3/2009 | Quintens |
| 7,687,125 | B2 | 3/2010 | Gavel et al. |
| 9,110,442 | B1 | 8/2015 | Raiford |
| 9,902,186 | B2 | 2/2018 | Whiteman et al. |
| 10,482,370 | B2 | 11/2019 | Okada et al. |
| 12,304,230 | B2 | 5/2025 | Blesovsky et al. |
| 12,358,317 | B2 | 7/2025 | Blesovsky et al. |
| 2003/0137145 | A1 | 7/2003 | Fell et al. |
| 2004/0219287 | A1 | 11/2004 | Regan et al. |
| 2007/0108386 | A1 | 5/2007 | Krul et al. |
| 2009/0011193 | A1 | 1/2009 | Barwich et al. |
| 2009/0291245 | A1 | 11/2009 | Rosset et al. |
| 2010/0001506 | A1 | 1/2010 | Rosset |
| 2010/0002303 | A1 | 1/2010 | Vast et al. |
| 2010/0078930 | A1 | 4/2010 | Rosset |
| 2010/0193146 | A1 | 8/2010 | Patel |
| 2010/0253062 | A1 | 10/2010 | Hardwick et al. |
| 2010/0295290 | A1 | 11/2010 | Muth et al. |
| 2010/0295291 | A1 | 11/2010 | Rancien et al. |
| 2012/0040123 | A1 | 2/2012 | Gavel et al. |
| 2012/0100340 | A1 | 4/2012 | Valera et al. |
| 2012/0177859 | A1 | 7/2012 | Gavel et al. |
| 2013/0270812 | A1 | 10/2013 | Murakami et al. |
| 2013/0341903 | A1 | 12/2013 | Ochiai et al. |
| 2014/0141181 | A1 | 5/2014 | Makansi et al. |
| 2015/0035270 | A1 | 2/2015 | Ormerod et al. |

(Continued)

FOREIGN PATENT DOCUMENTS

| | | | |
|---|---|---|---|
| AU | 2013101097 | A4 | 9/2013 |
| CA | 2594806 | C | 6/2015 |

(Continued)

OTHER PUBLICATIONS

[No Author Listed], Rayon. Wikipedia. Apr. 13, 2022. <https://en.wikipedia.org/wiki/Rayon> [last accessed Apr. 13, 2022].
[No Author Listed], Cellophane. Wikipedia. Sep. 5, 2022. <https://en.wikipedia.org/wiki/Cellophane> [last accessed Oct. 6, 2022].
U.S. Appl. No. 17/427,003, filed Jul. 29, 2021, Blesovsky et al.
U.S. Appl. No. 17/427,024, filed Jul. 29, 2021, Blesovsky et al.
U.S. Appl. No. 17/426,928, filed Jul. 29, 2021, Blesovsky et al.
International Search Report and Written Opinion for International Application No. PCT/EP2019/052243 mailed May 27, 2019.

(Continued)

*Primary Examiner* — Betelhem Shewareged

(74) *Attorney, Agent, or Firm* — Wolf, Greenfield & Sacks, P.C.

(57) ABSTRACT

There is described the use of a transparent film comprising a non-fibrous substrate layer of regenerated cellulose in the manufacture of a security article exhibiting printed information, wherein said transparent film is the material on which printed information and optionally one or more other security feature(s) is disposed, and wherein said transparent film exhibits one or more, and preferably all, of the following properties: haze of no more than 10%, preferably no more than 5%, preferably no more than 4%, preferably no more than 2.5%; birefringence of from about 400 to about 800 nm; a surface energy of at least about 38 dynes, preferably at least about 40 dynes, preferably at least about 42 dynes, and preferably no more than from about 60 dynes; and a water vapour permeability in the range of from about 20 to about 40, preferably from about 25 to about 35, preferably from about 28 to about 32 $g/m^2$/24 hours at 25° C. and 75% relative humidity, and/or in the range of from about 110 to about 130, preferably from about 115 to about 125, preferably from about 118 to about 122 $g/m^2$/24 hours at 38° C. and 90% relative humidity.

21 Claims, No Drawings

(56) References Cited

U.S. PATENT DOCUMENTS

| | | | |
|---|---|---|---|
| 2015/0191036 A1 | 7/2015 | Ratnakumar et al. | |
| 2015/0293437 A1 | 10/2015 | Read | |
| 2015/0298481 A1 | 10/2015 | Sarrazin | |
| 2015/0322222 A1 | 11/2015 | Power et al. | |
| 2016/0039195 A1 | 2/2016 | Schaede | |
| 2017/0066279 A1 | 3/2017 | Karrer Walker et al. | |
| 2018/0043723 A1 | 2/2018 | Brehm et al. | |
| 2019/0092080 A1 | 3/2019 | Sugdon | |
| 2022/0097440 A1 | 3/2022 | Blesovsky et al. | |
| 2022/0118784 A1 | 4/2022 | Blesovsky et al. | |
| 2022/0144003 A1 | 5/2022 | Blesovsky et al. | |
| 2022/0144004 A1* | 5/2022 | Blesovsky | B42D 25/29 |

FOREIGN PATENT DOCUMENTS

| | | | |
|---|---|---|---|
| DE | 202012010037 | U1 | 1/2014 |
| EP | 0 202 812 | A2 | 11/1986 |
| EP | 0 549 384 | A1 | 6/1993 |
| EP | 1 034 536 | B1 | 6/2002 |
| EP | 2 367 692 | B1 | 3/2013 |
| EP | 3 168 052 | A1 | 5/2017 |
| EP | 3 228 744 | A1 | 10/2017 |
| FR | 2932116 | A1 | 12/2009 |
| GB | 1127043 | A | 9/1968 |
| GB | 1256790 | A | 12/1971 |
| GB | 2306178 | A | 4/1997 |
| IN | 285588 | B | 7/2017 |
| JP | S49-21197 | A | 2/1974 |
| JP | H07-68980 | A | 3/1995 |
| JP | H11-120414 | A | 4/1999 |
| JP | 2011-099064 | A | 5/2011 |
| JP | 2012-136822 | A | 7/2012 |
| JP | 2012-214717 | A | 11/2012 |
| JP | 2018-053419 | A | 4/2018 |
| WO | WO 2006/007745 | A1 | 1/2006 |
| WO | WO 2006/077689 | A1 | 7/2006 |
| WO | WO 2009/062229 | A1 | 5/2009 |
| WO | WO 2010/057995 | A1 | 5/2010 |
| WO | WO 2011/042349 | A1 | 4/2011 |
| WO | WO 2012/003947 | A1 | 1/2012 |
| WO | WO 2013/127745 | A1 | 9/2013 |
| WO | WO 2014/140024 | A1 | 9/2014 |
| WO | WO 2016/055297 | A1 | 4/2016 |
| WO | WO 2016/120612 | A1 | 8/2016 |
| WO | WO 2016/149762 | A1 | 9/2016 |
| WO | WO 2017/219088 | A1 | 12/2017 |
| WO | WO 2018/191827 | A1 | 10/2018 |
| WO | WO 2019/101683 | A1 | 5/2019 |
| WO | WO 2020/020544 | A1 | 1/2020 |
| WO | WO 2020/156657 | A1 | 8/2020 |

OTHER PUBLICATIONS

International Preliminary Report on Patentability (Chapter II) for International Application No. PCT/EP2019/052243 mailed May 20, 2020.

International Search Report and Written Opinion for International Application No. PCT/EP2019/052244 mailed Mar. 26, 2019.

International Preliminary Report on Patentability (Chapter II) for International Application No. PCT/EP2019/052244 mailed May 20, 2020.

International Search Report and Written Opinion for International Application No. PCT/EP2019/052245 mailed Mar. 26, 2019.

International Preliminary Report on Patentability (Chapter II) for International Application No. PCT/EP2019/052245 mailed May 27, 2020.

International Search Report and Written Opinion for International Application No. PCT/EP2019/052246 mailed Mar. 27, 2019.

International Preliminary Report on Patentability for International Application No. PCT/EP2019/052246 mailed Aug. 12, 2021.

* cited by examiner

POLYMERIC SECURITY ARTICLES

CROSS-REFERENCE TO RELATED APPLICATIONS

This application is a national stage filing under 35 U.S.C. § 371 of International Application No. PCT/EP2019/052243, filed Jan. 30, 2019, which is hereby incorporated herein by reference in its entirety.

The present invention relates to the use of regenerated cellulose film in the manufacture of a security article, particularly a banknote.

Polymeric security articles, such as banknotes (or currency notes), offer several advantages over their paper counterparts. For example, polymeric security articles can incorporate security features (such as transparent window regions) which are not generally possible for paper security articles. Polymeric security articles last significantly longer than paper security articles, which can decrease their environmental impact and reduce the overall cost of production and replacement.

Polymeric banknotes have increased in popularity in recent years. Polymeric banknotes currently in circulation are made from biaxially oriented polypropylene (BOPP) films, formed by extruding and stretching a polypropylene film in two orthogonal directions (the longitudinal and transverse directions) during manufacture. In the manufacture of banknotes from BOPP films, opacification layers are typically disposed on both surfaces of the film by a conventional gravure printing process which applies at least one layer of white ink onto each surface of the film. BOPP films are, however, associated with certain processing difficulties.

For example, BOPP is an electrical insulator and so static electricity can build up on the surface of a BOPP film when it is handled, for instance during rewinding, coating, laminating and printing, and this can lead to problems such as jamming and sticking in processing devices. To reduce the build-up of static electricity, an anti-static agent is incorporated into coating layers, traditionally the afore-mentioned opacification layers. However, problems remain. Transparent window regions are popular and useful security features of polymeric banknotes, but an opaque coating containing the anti-static agent is necessarily absent in these regions. The build-up of static electricity on the window regions of BOPP banknotes can lead to jamming and sticking during downstream manufacture, processing and handling, for instance during printing and in ATM machines (where double feeding and jamming can occur). As such, the size and incidence of window region(s) in a BOPP banknote are very limited.

Once the BOPP film has been opacified and treated with anti-static agent, the information, images and security features desired for the banknote are then printed and/or applied to the film. Thus, conventional production of BOPP banknotes involves three distinct stages: (i) manufacture of the BOPP film; (ii) subsequent opacification and introduction of an anti-static agent; and (iii) subsequent application of the banknote-specific information.

BOPP is not biodegradable and impacts negatively on the environment. While BOPP articles may be recycled by shredding, melting into pellets and then reforming into new articles, it remains the case that only a relatively small fraction of BOPP articles are recycled at the end of their lifetime and there is a limit to the number of times that BOPP can be recycled. Moreover, non-biodegradable plastics in the form of micro-particles are known to find their way into the food-chain. There is a need for more environmentally friendly and sustainable banknotes.

It would be desirable to address at least one of the aforementioned problems. In particular, it would be desirable to provide a banknote or other security article which is more efficiently and economically produced, for example by reducing the number of processing steps. In addition, it would be desirable to provide a banknote or other security article which did not suffer from a build-up of static electricity, and hence which exhibited improved processing and handling, and which allowed larger window regions in the security article. It would also be desirable to provide a more environmentally friendly banknote.

According to a first aspect of the present invention, there is provided the use of a transparent film comprising a non-fibrous substrate layer of regenerated cellulose in the manufacture of a security article exhibiting printed information, wherein said transparent film is the material on which printed information and optionally one or more other security feature(s) is disposed, and wherein said transparent film exhibits one or more, and preferably all, of the following properties:

(i) haze of no more than 10%, preferably no more than 5%, preferably no more than 4%, preferably no more than 2.5%;

(ii) birefringence of from about 400 to about 800 nm;

(iii) a surface energy of at least about 38 dynes, preferably at least about 40 dynes, preferably at least about 42 dynes, and preferably no more than from about 60 dynes; and (iv) a water vapour permeability in the range of from about 20 to about 40, preferably from about 25 to about 35, preferably from about 28 to about 32 $g/m^2/24$ hours at 25° C. and 75% relative humidity, and/or in the range of from about 110 to about 130, preferably from about 115 to about 125, preferably from about 118 to about 122 $g/m^2/24$ hours at 38° C. and 90% relative humidity.

Preferably at least feature (iv) is exhibited by the transparent film, and preferably also feature (i), preferably also with one or both of features (ii) and (iii).

A security article may be selected from security documents, bonds, share certificates, stamps, tax receipts, identification documents (such as passports), security tags, security badges and banknotes. Preferably the security article is in the form of a sheet, particularly a banknote or security document, and preferably the security article is a banknote.

The thickness of the transparent film is preferably from about 10 to about 250 μm, preferably at least 15 μm, preferably at least 30 μm, preferably at least about 50 μm, preferably no more than about 150 μm, preferably no more than about 130, preferably no more than about 120 μm, preferably no more than about 90 μm, preferably from about 55 to about 80 μm. The transparent film preferably makes up at least about 85%, preferably at least about 90%, preferably at least 95%, and preferably at least 98% of the thickness of the security article.

The present invention advantageously allows the manufacture of a security article in a more efficient and economic manner, and the manufacture of a security article into which larger window regions may be included, and the manufacture of a security article which has reduced environmental impact.

As used herein, the term “opacification” means the coating of at least a portion of at least one surface of a transparent film with a material which renders said portion opaque. An “opacification layer” is a layer of a material covering at least a portion of at least one surface of a transparent film rendering said portion opaque. Preferably the material which renders portions of the transparent film opaque comprises one or more opacifying and/or whitening agent(s), typically dissolved or suspended in a solvent or vehicle. Suitable opacifying and whitening agents are well known in the art, and are preferably selected from titanium dioxide, barium sulphate and calcium carbonate, and preferably from titanium dioxide. Suitable vehicles are similarly well known in the art, and include nitrocellulose.

As used herein, the term "printed information" refers in particular to information selected from one or more of images, patterns and alphanumeric characters. At least some of the printed information is preferably an anti-counterfeit feature added to a security article to increase the difficulty of forgery. Such printed information are often intricate and detailed, making offset printing a particularly suitable technique for incorporating them. Typical examples of such printed information include:

(i) geometric lathe work (e.g. a guilloché, which is an ornamental pattern formed of two or more curved bands that interlace to repeat a circular design);
(ii) micro-printing (the use of extremely small text, generally small enough to be indiscernible to the naked eye);
(iii) printed information comprising optically variable colour-changing inks;
(iv) printed information comprising magnetic inks;
(v) printed information comprising fluorescent inks;
(vi) serial numbers (often including a check digit);
(vii) anti-copying marks (filtering features may be added to the printing hardware and software available to the public which senses anti-copying marks included in security articles and prevents the reproduction of any material including those marks); and
(viii) registration of printed information in both surfaces of the security article (e.g. banknotes are typically printed with fine alignment between the printing on each surface of the note which is difficult to reproduce).

THE TRANSPARENT FILM

The transparent film is self-supporting film, by which is meant capable of independent existence in the absence of a supporting base.

Regenerated cellulose film may be manufactured by the conversion of naturally occurring cellulose to a soluble cellulosic derivative and subsequent regeneration to form a film. Preferably, the regenerated cellulose film is manufactured by the Viscose process in which natural cellulose is treated with a base, e.g. sodium hydroxide, and carbon disulphide to form a cellulose xanthate salt also called viscose. The viscose solution is then extruded through a slit into a regeneration bath of dilute sulfuric acid and sodium sulfate to reconvert the viscose into cellulose. A preferred process for preparation of the regenerated cellulose substrate layer used in the present invention is described in more detail below.

Preferably, the cellulose-containing material used as the raw material of the present invention comprises, consists essentially of or consists of a wood material. Preferably, the cellulose-containing material comprises, consists essentially of or consists of wood pulp.

The cellulose-containing pulp (preferably wood pulp) is mixed with hot alkaline solution (preferably caustic soda solution) to form a slurry and subjected to a steeping step, during which the cellulose structure swells and the polymer chains move further apart.

The slurry is then concentrated, for instance from about a starting concentration of less than about 10%, typically less than about 5%, and typically about 4% cellulose, preferably to a concentration of from about 30 to about 40%, preferably at least about 35%, and typically about 36%, by any suitable means, preferably using a slurry press. The excess alkaline solution may be returned to the steeping step. The resultant concentrate (typically referred to as a press cake) is broken up, typically by shredding, to form alkali cellulose. Alkali cellulose is highly reactive and is the starting point for the manufacture of many water-soluble cellulose derivatives.

Cellulose is a polymer of glucose, and the chain length (or degree of polymerisation (DP)) affects the viscosity of a soluble cellulose solution. Preferably, the chain length of the alkali cellulose is adjusted by ageing in air, preferably at about 45° C. and 50% RH. During the ageing process, the glycosidic linkages in the polymer chain are broken, causing the formation of shorter polymer chains, a mechanism similar to the process of bio-degradation.

The alkali cellulose is reacted under vacuum with carbon disulphide ($CS_2$), typically for a period of about 50 minutes. Cellulose xanthate is formed by reaction of the hydroxyl groups on the cellulose chain with $CS_2$. When the xanthation is completed, the product is dissolved in alkali (preferably dilute caustic soda) to form viscose, which is typically about 9.0% cellulose and about 6.0% sodium hydroxide. The liquid is viscous (60-90 Poise), non-Newtonian and unstable (it coagulates in about 2 days at 25° C.). The viscose is filtered, and preferably particles above about 8 μm are removed.

Preferably, the viscose is stored at a controlled temperature for about 15 hours to reduce its stability. During this ageing step, substituted xanthate groups react with free caustic soda in the viscose. As the number of xanthate groups reduce, the viscose coagulates more readily.

The viscose is metered into a die which has extrusion lips pointing downwards into the coagulation bath containing a solution of sodium sulphate (preferably about 20%) and sulphuric acid (preferably about 14%) at about 43° C. The thickness of the extruded film is typically up to about 350 μm, for instance 250-350 μm. The reaction of the acid with the xanthate precipitates cellulose. The cast sheets of impure cellulose are preferably passed through a plurality of baths containing successively weaker acid/sulphate mixtures, thereby completing the reaction with the xanthate and acidifying the cellulose film.

The regenerated cellulose film is then washed with water, preferably in hot water at about 95° C., to remove residual acid, sulphate and carbon disulphide. The pH of the wash is then preferably increased to about 12 to dissolve any residual sulphur compounds before further washing with hot water.

Preferably, the regenerated cellulose film is then washed with cooler water, and then contacted with a solution of sodium hypochlorite (preferably a weak solution), thereby destroying residual sulphur compounds and dissolving impurities (for instance residual iron compounds). The film is then washed to remove residual hypochlorite, to provide the regenerated cellulose film.

Optionally, the regenerated cellulose film may be dyed or coloured, as for cotton or cellulosic fibres (such as rayon), using conventional dyes and colourants known in the art. Powder and/or liquid dyes may be used. Dyeing or colouring is preferably effected by passing the film through a series of hot baths containing dye solution. Residual dye is then washed out of the film.

Preferably, the regenerated cellulose film is treated or coated with a plasticiser, which improves the flexibility of the regenerated cellulose film. Suitable plasticisers are well known in the art, for instance glycols and urea.

Preferably, the regenerated cellulose film is treated or coated with an anti-blocking additive, which improves the handling, slip properties and windability of the film. Anti-blocking additives are well-known in the art. A preferred anti-blocking additive for use in the present invention is silica. The anti-blocking additive is preferably in the form of a particulate dispersion in a suitable vehicle, and is preferably in the form of a silica dispersion.

Optionally, the regenerated cellulose film is treated or coated with an anchor resin, which improves the adhesion and strength of subsequently applied layers. Suitable anchor resins are well known in the art and are preferably selected from urea-formaldehyde and melamine-formaldehyde resins.

Thus, preferably the regenerated film exhibits on one or each surface thereof one or more coating layer(s) of plasticiser and/or anti-blocking additive and optionally an anchor resin, preferably of plasticiser and anti-blocking additive and optionally an anchor resin, and in one embodiment a plasticiser, anti-blocking additive and anchor resin. Preferably, the regenerated film exhibits on one or each surface thereof a single coating layer of plasticiser and/or anti-blocking additive and optionally an anchor resin, preferably a plasticiser and anti-blocking additive and optionally an anchor resin, and optionally a plasticiser, anti-blocking additive and anchor resin.

Said plasticiser, anti-blocking additive and/or anchor resin components may be disposed on a surface of the regenerated cellulose film in the form of a coating composition which contains said component(s) as a solution or dispersion in a suitable vehicle or binder, typically wherein a binder is a polymeric binder.

The plasticiser, anti-blocking additive and/or anchor resin components may be disposed on a surface of the regenerated cellulose film using any conventional application technique. These component(s) may be disposed sequentially or simultaneously, preferably simultaneously. For instance, said component(s) may be disposed on a surface of the film by passing the film into a bath containing these component(s), and preferably a mixture of these components. Conventional coating techniques, such as gravure coating, may also be used. A coating or varnishing tower may be used.

The total dry thickness of said coating layer(s) of plasticiser, anti-blocking additive and/or anchor resin component (s) on the or each surface of said regenerated cellulose film is preferably in the range of from about 0.1 to about 1.0 μm.

The regenerated cellulose film is then dried in hot air, preferably under tension, to provide a film having a moisture content of about 4-10%, preferably about 5-8%.

The regenerated cellulose substrate layer produced by the above process is then wound onto reels, typically up to about 12 km long, and from about 1300 to about 1600 mm wide.

The substrate layer of regenerated cellulose is non-fibrous. In other words, the substrate layer of regenerated cellulose does not include any fibers (e.g. regenerated cellulose fibres). The substrate layer is preferably an extruded non-fibrous layer of regenerated cellulose. It will be appreciated that the term "fibrous" does not refer to polymeric cellulosic chains, but instead to the fibres formed by multiple polymeric cellulosic chains which are bound together by intermolecular forces between chains to form cellulose fibres comprising many tens of polymer chains as, for instance, found in naturally occurring cellulosic fibre such as cotton.

Naturally occurring cellulose comprises, consists or consists essentially of linear chains of β(1→4) linked D-glucose units. The regenerated cellulose used in the present invention comprises, and preferably consists or consists essentially of, linear (i.e. unbranched) chains of β(1→4) linked D-glucose units and/or is chemically identical to naturally occurring cellulose. Thus, the regenerated cellulose used in the present invention is not regenerated cellulose which has been chemically modified, for example by covalently bonded chemical radicals, for instance by reaction with a tertiary amine oxide. Thus, the regenerated cellulose has the chemical formula $(C_6H_{10}O_5)_n$, where n is the degree of polymerisation. In the regenerated cellulose substrate layers of the present invention, preferably n is at least about 200, preferably at least about 250, preferably at least about 300, typically about 350, and typically less than about 1000, more typically less than about 800, more typically less than about 600, most typically less than about 400. Preferably, the degree of polymerisation is from about 320 to about 380.

The substrate layer of regenerated cellulose is co-extensive with the transparent film. In other words, the length and width dimensions of the substrate layer of regenerated cellulose are the same as the length and width dimensions of the transparent film.

The transparent film preferably comprises an ink-receptive layer on one or both surfaces thereof. The ink-receptive layer improves the adhesion of subsequently applied inks to the regenerated cellulose substrate. The ink-receptive layer preferably consists of, consists essentially of or comprises an ink-receptive polymer, preferably selected from nitrocellulose, vinyl acetate/vinyl chloride co-polymers, and copolyesters. Thus, prior to printing onto the transparent film during the manufacture of the security article, for instance by disposing a printed opacification layer and/or printed information onto the transparent film, there is preferably disposed an ink-receptive layer onto one or both surfaces of the regenerated cellulose film, preferably by coating a coating composition. Any conventional coating process may be used, and preferably a solvent coating process is used. The coating composition preferably comprises an ink-receptive polymer in a solvent vehicle, preferably wherein the solvent is a mixed solvent, preferably selected from THF/toluene and isopropylacetate/toluene. After application of the coating composition, the solvent is removed by drying the coated film, as is conventional in the art, and the coated film re-wound onto a reel.

The transparent film preferably comprises a barrier material on one or both surfaces thereof, to reduce the water vapour permeability of the film. Suitable barrier materials are well-known in the art and include, for instance, polyvinylidenechloride (PVdC). Thus, prior to printing onto the transparent film during the manufacture of the security article, for instance by disposing a printed opacification layer and/or printed information onto the transparent film, there is preferably disposed a barrier material onto one or both surfaces of the regenerated cellulose film, preferably by coating a coating composition. The barrier material may be coated using any conventional coating process, as described hereinabove in respect of the ink-receptive layer. The barrier material is preferably coated simultaneously with the ink-receptive polymer, and is preferably present in the ink-receptive coating. Alternatively, said barrier material may be coated separately and be in the form of a barrier coating.

The ink-receptive layer is preferably co-extensive with the substrate layer of regenerated cellulose. In other words, the length and width dimensions of the ink-receptive layer are the same as the length and width dimensions of the substrate layer of regenerated cellulose. Similarly, said barrier material is preferably co-extensive with the substrate layer of regenerated cellulose.

The substrate layer of regenerated cellulose preferably makes up at least 85%, preferably at least 90%, preferably at least 95%, preferably at least 98%, and preferably at least 99% of the thickness of the transparent film. As described hereinabove, the substrate layer of regenerated cellulose may have disposed a coating layer on one or both surfaces thereof. Thus, in a preferred embodiment, the transparent film comprises or consists essentially of or consists of said substrate layer of regenerated cellulose and said ink-receptive coating and/or said barrier material. As described hereinabove, said substrate layer of regenerated cellulose is a regenerated cellulose film which optionally comprises a plasticiser and/or an anti-blocking additive and/or an anchor resin on one or each surface thereof, preferably in the form of one or more coating layer(s) (preferably a single coating layer) disposed on the or each surface. In the present invention, it is intended that no layer which is coextensive with the substrate layer be laminated with said substrate layer. The substrate layer of regenerated cellulose, and the transparent film, preferably exhibit haze of no more than 10%, preferably no more than 5%, preferably no more than 4%, preferably no more than 2.5%. The total luminous transmission (TLT) for light in the visible region (400 nm to 700 nm) is preferably at least 80%, preferably at least 85%, more preferably at least about 90%. Haze and TLT are preferably measured by standard test method ASTM D1003.

The polymer chains in the regenerated cellulose film are oriented and hence exhibit birefringence. Preferably, the substrate layer of regenerated cellulose, and hence the transparent film, have a birefringence (expressed as the measured retardation) is no more than about 800, preferably no more than about 750, preferably no more than about 700, preferably at least 400, preferably at least 500, preferably from about 400 to about 750, preferably from about 500 to about 700, preferably from about 550 to about 650 nm. Birefringence is proportional to orientation and thickness, and preferably the birefringence of the substrate layer is from about 8 to about 12, preferably from about 9 to about 11, preferably from about 9.5 to about 10.5, preferably about 10 nm per micron thickness of the substrate. Birefringence in transparent polymer films may suitably be measured by standard test ASTM D4093-95 (2001).

The transparent film preferably exhibits a surface energy of at least about 38 dynes, preferably at least about 40 dynes, preferably at least about 42 dynes, and preferably no more than from about 60 dynes, preferably no more than from about 50 dynes, preferably no more than about 48 dynes. The surface energy of a transparent film may suitably be measured using the procedure described in ASTM D 2578. The surface energy provides a measure of the ability of the surface of the film to attract a liquid (e.g. a printing ink) and allow it to wet the surface. A surface energy of greater than about 38 dynes improves the wetting of the surface by liquids such as printing inks. Advantageously, films of regenerated cellulose which exhibit a surface energy within the above ranges avoid the need for pre-treatments such as corona, flame and nitrogen plasma treatments which are typically required to increase the surface energy of BOPP films prior to printing.

The transparent film preferably exhibits a coefficient of friction (preferably as measured according to ASTM D 1894) which is not too high that the film becomes too hard to pick up in an automated processing or handling device, and is not too low that the film experiences jamming or sticking in an automated processing or handling device, and may cause double-feeding problems in an ATM. As discussed herein, the coefficient of friction of the transparent film is preferably controlled by the addition of anti-blocking or slip additives. A preferred anti-blocking agent is silica, which modulates the surface roughness of the film, which is the preferred method of controlling the coefficient of friction in the present invention. Other suitable additives include solid slip additives such as silicone or PTFE, and migratory waxes such as glycerol monostearate or erucamide, which modulate the coefficient of friction by lubrication or alteration of the surface energy of the film.

Advantageously, the transparent film of the present invention, and the transparent film which is used to manufacture the security device, does not require and preferably does not contain an anti-static agent. The regenerated cellulose films used in the transparent films of the present invention are not susceptible to a build-up of static electricity and do not require the inclusion of anti-static agents, thereby reducing manufacturing costs and increasing manufacturing efficiency. Thus, the use and transparent film of the present invention excludes the addition of an anti-static agent to said substrate layer or any part of said transparent film, or to any printed opacification layer disposed on a surface of the transparent film as described hereinbelow, and preferably an anti-static agent is not present in any part of said security article.

Preferably, the transparent film of the present invention, and the transparent film which is used to manufacture the security device, is devoid of watermarks, light-sensitive additives, taggants, markers or other security features. Advantageously, it is then possible to use the same substrate and the same transparent film, as well as the same offset-printed film produced by offset-printing on the transparent film (as described hereinbelow), for all denominations of a given currency, since the security features are applied after any printed opacification layer(s) and printed information have been disposed on the film, thereby reducing manufacturing costs. In addition, the banknote printer or manufacturer is able to retain a larger stock of the transparent film referred to herein and thereby better control the manufacturing process across a range of different currency and/or denominations of a given currency, without delay in the supply of batches of a specific substrate for a specific currency or denomination, thereby improving the efficiency and economy of the manufacturing process.

Optionally, the transparent film may be coloured or dyed, as described above.

The water vapour permeability of the transparent film is preferably in the range of from about 20 to about 40, preferably from about 25 to about 35, preferably from about 28 to about 32 g/m$^2$/24 hours at 25° C. and 75% relative humidity. Preferably, water vapour permeability is in the range of from about 110 to about 130, preferably from about 115 to about 125, preferably from about 118 to about 122 g/m$^2$/24 hours at 38° C. and 90% relative humidity. Water vapour permeability may be measured by any method suitable in the art, and preferably by ASTM E96.

Printing

In the manufacture of security articles according to the present invention, the transparent film is printed with printed information on one or both surfaces of the film, and optionally an opacification layer on one or both surfaces of the film. Preferably, the printed information, and preferably also the printed opacification layer (where present), is disposed by an offset-printing method. Where an opacification layer is present, it is disposed prior to the printing of the printed information. Thus, in the manufacture of security articles according to the invention, a transparent film is introduced into a printing device and printed accordingly.

In a first preferred embodiment, the manufacture of the security article comprises the steps of:

a. introducing into an offset printing device said transparent film comprising a non-fibrous substrate layer of regenerated cellulose;
b. disposing an opacification layer on at least a portion of at least one surface of said film by a first offset printing step; and
c. disposing printed information on at least a portion of said opacification layer by a second offset printing step.

In first embodiment, the first offset printing step and the second offset printing step may be performed in different offset printing devices, but are preferably performed in the same offset printing device.

In a second preferred embodiment, the manufacture of the security article comprises the steps of:

a. introducing into a printing device a discrete sheet of said transparent film comprising a non-fibrous substrate layer of regenerated cellulose;
b. disposing an opacification layer on at least a portion of at least one surface of said film by a first printing step; and
c. disposing printed information on at least a portion of said opacification layer by a second printing step wherein said second printing step is an offset printing step.

In the second embodiment, said first printing step is preferably selected from screen printing and offset printing. Preferably said first printing step is an offset printing step, in which case the first offset printing step and the second offset printing step may be performed in different offset printing devices, but are preferably performed in the same printing device.

In a third preferred embodiment, the manufacture of the security article comprises the steps of:

a. introducing into an offset printing device a transparent film comprising a non-fibrous substrate layer of regenerated cellulose; and
b. disposing printed information directly on at least a portion of said transparent film by an offset printing step.

In the third embodiment, an opacification layer is absent. In other words, there is no opacification layer between the transparent film and said printed information.

Advantageously, regenerated cellulose films are not susceptible to a build-up of static electricity, and so it is not necessary to dispose an anti-static agent-containing opacification layer prior to introduction into the printing device, as required for instance for BOPP films. Thus, the transparent film comprising a substrate layer of regenerated cellulose film can advantageously be introduced directly into the printing device, thereby removing the need for a preceding separate opacification step, and thereby improving the efficiency of manufacture of the security article.

Advantageously, where an opacification layer is printed, the printing device disposes an opacification layer onto the transparent film and also disposes printed information onto said opacification layer and/or directly onto said transparent film.

An offset printing step used in the present invention is preferably a simultaneous offset printing step, which prints on each side of said film simultaneously.

Offset printing, also referred to as offset lithography, is a method of mass-production printing in which images on printing plates are transferred (offset) to flexible rollers and then to the print media (i.e. the transparent film in the present invention). The print media does not come into direct contact with the printing plates.

Offset printing devices are known in the art and generally comprise a plurality of printing units, each comprising a plate cylinder, a blanket cylinder (usually made from rubber) and optionally an impression cylinder. The plate cylinder is a roller to which is attached the printing plate (usually metallic, preferably aluminium). During printing, the printed information created by the ink on the printing plate is transferred to the blanket cylinder and then transferred from the blanket cylinder onto the print media. The impression cylinder carries the print media through the printing unit and provides a hard backing against which the blanket cylinder can impress the printed information on the print media. Offset printing creates printed information having sharper lines and images than other printing techniques because the blanket cylinder is flexible and therefore can conform to the texture of the surface of the print media.

Each printing unit prints a single colour ink. For full-colour printing, four ink colours are used (cyan, magenta, yellow and black) and so a minimum of four printing units are used for full colour printing, with each printing unit using a single colour ink. Optionally, a fifth printing unit may be included for applying intaglio-printed information, specialised inks (e.g. magnetic or metallic inks), coatings or varnishes to the print media.

During operation, print media passes through each of the printing units of the offset printing device and printed information is disposed on a first surface of the print media. The printed media may then be allowed to dry, before being rotated through 180° and passed through the same or different offset printing device to print on the second surface of the print media.

Extended offset printing devices comprise a reversing cylinder after the first set of printing units followed by a second set of printing units. These extended offset printing devices may therefore comprise 8-10 printing units in total. During operation, print media passes through the first set of printing units of the extended offset printing device and printed information is disposed on a first surface of the print media. The reversing cylinder then rotates the print media through 180° in the extended offset printing device and the print media is passed through the second set of printing units to print on the second surface of the print media.

Simultaneous offset printing devices comprise one or more simultaneous print units in which the impression cylinder is replaced with a second blanket cylinder allowing for printing on each surface of the print sheet simultaneously. Each simultaneous printing unit therefore comprises a first and second plate cylinder and a first and second blanket cylinder (usually made from rubber). During printing, printed information created by the ink on the printing plates attached to the first and second plate cylinders is transferred to the first and second blanket cylinders and is then transferred from the first and second blanket cylinders onto the first and second surfaces of the print media simultaneously. Such simultaneous offset printing devices are the preferred devices for use in the present invention.

Thus, an offset printing device suitable for use in the present invention comprises printing units (preferably simultaneous printing units) for disposing printed information on a surface of the transparent film and, where present, on the opacification layer. The offset printing device preferably further comprises one or more opacification printing units for disposing one or more opacification layers (e.g. white ink) on at least a portion of at least one surface of the transparent film. Preferably, the opacification printing unit is a simultaneous printing unit for disposing an opacification layer on at least a portion of each surface of the transparent film simultaneously. Optionally, further printing units and/or simultaneous printing units may be included to incorporate intaglio printed information, specialised inks (e.g. magnetic or metallic inks), coatings or varnishes.

An opacification layer is preferably disposed on at least a portion of at least one surface and preferably each surface of the transparent film. Optionally, a plurality of opacification layers may be disposed on at least a portion of at least one surface of the transparent film, and preferably on at least a portion of each surface of the transparent film.

The opacity of the security article or the assembly comprising the transparent film and said opacification layer(s) may be measured as the transmission optical density (TOD). Preferably, the TOD of said security article, or said assembly, is at least 0.4, preferably at least 0.5, preferably at least 0.6, preferably at least 0.7, preferably at least 0.8, preferably at least 1.0 and preferably at least 1.5, and in one embodiment preferably at least 2.0, in the portion(s) where the opacification layer is present. Transmission Optical Density (TOD) may be measured using a Macbeth Densitometer TR 927 in transmission mode.

In a preferred embodiment, no more than 90%, or no more than 80%, or no more than 70%, or no more than 60% of a surface of said transparent film is printed with an opacification layer.

In the manufacture of the security articles, a printed opacification layer is preferably disposed on at least a portion of at least one surface of the transparent film, and printed information is preferably disposed on at least a portion of said printed opacification layer, preferably by a second offset printing step. Preferably, printed information is also disposed directly on a portion of a surface of the transparent film which is not covered by an opacification layer, preferably by said second offset printing step.

Thus, a printed film produced by the method of the present invention preferably exhibits a surface which has one or more opacified portion(s) on which an opacification layer is disposed, and further exhibits one or more non-opacified portion(s) on which an opacification is not disposed, preferably wherein printed information is disposed directly on one or more of said non-opacified portion(s), preferably by said second offset printing step.

The method of the present invention may be a web-fed process or a sheet-fed process.

In a web-fed process, the method of steps (a) to (c) of the first embodiment and the method of steps (a) and (b) of the third embodiment, is preferably a reel-to-reel process in which a web of said transparent film is fed into said printing device, printed and then re-wound onto a reel. In a preferred embodiment, the method comprises, after step (c) of the first embodiment or after step (b) of the third embodiment, the step of cutting the offset-printed film into sheets prior to the application of additional printed information and/or security features thereon.

In a sheet-fed process, discrete sheets of transparent film are fed into said printing device.

In the manufacture of security articles disclosed herein, after step (c) of the first or second embodiments or after step (b) of the third embodiment, additional printed information is preferably disposed on one or both surfaces of the offset-printed film. Any conventional printing process may be used, but preferably said additional printed information is disposed by intaglio printing.

Said printed information and said additional printed information are preferably independently selected from one or more of images, patterns and alphanumeric characters.

After step (c) of the first or second embodiments or after step (b) of the third embodiment, and preferably after said optional step of disposing additional printed information, the manufacture of security articles disclosed herein preferably comprises disposing one or more security feature(s) on one or both surfaces of said offset-printed film. Said one or more security features are preferably selected from additional alphanumeric information such as a printed signature or serial number; optical security feature(s) such as a hologram; and printed features (particularly screen-printed features) comprising optically variable ink, magnetic ink and/or fluorescent ink.

After step (c) of the first or second embodiments or after step (b) of the third embodiment, and preferably after said optional step(s) of disposing additional printed information and/or one or more security feature(s), the manufacture of security articles disclosed herein preferably comprises disposing a protective layer such as a varnish on one or both surfaces of said offset-printed film. Suitable varnishes are known in the art and include varnishes which may be dried by thermal or infrared radiation or UV-cured varnishes.

Preferably, after said additional printed information and/or security features and/or protective layer have been applied to a sheet of said offset-printed film, the manufacture of security articles disclosed herein further comprises the step of cutting said sheets into a plurality of smaller pieces to provide a plurality of security articles.

As noted above, window regions are important security features for security articles. A window region is a portion of the security article in which an opacification layer is absent on both surfaces of the transparent film. It will be appreciated that the presence of a window region requires an opacification layer to be present on at least a part of one surface of said security article.

Preferably, at least part of a window region is transparent. In the present invention, a transparent window region preferably comprises printed information and/or security features disposed in the window region. It will be appreciated that the areas of the window region on which printed information and/or security features are disposed is not transparent. Thus, preferably at least part of said window region is transparent, preferably wherein said at least part of said window region exhibits a haze of no more than 10%, preferably no more than 5%, preferably no more than 4%, preferably no more than 2.5%.

Preferably, in the security articles disclosed herein, said one or more window region(s) constitute at least 30%, preferably at least 40% of the surface area of the printed film. As noted above, conventional BOPP films which require the use of an anti-static agent in the opacification layer do not contain anti-static agent in the window region, and so the size of the window region is typically restricted to less than about 25% of the surface area in order to avoid a build-up of static electricity in this area in order to avoid jamming, sticking and double-feeding in processing devices. The regenerated cellulose films used in the present invention are not susceptible to a build-up of static electricity, and allow larger and/or greater numbers of window region(s) in the security articles.

The regenerated cellulose substrate layer used in the present invention is an oriented film and exhibits birefringence.

Historically, security article processing machines have required that the security article exhibits an opaque leading edge so that the position of the security article can be accurately identified and the security article can be tracked through the machine, and this has restricted the use of window regions along one or more edges of a security article. In addition, sensors in security article processing machines may incorrectly identify a window region as a hole in the security article, causing the machine to jam or register the security article as faulty. However, these problems are resolved by the presence of birefringence in the security article, and the use of polarized light in processing machines. Accordingly, it is now possible to accurately identify the position of the security article and track it through the machine even if a window region extends along the leading edge of the security article, and avoid the processing machine incorrectly identifying a window region as a hole.

Advantageously, therefore, the security articles disclosed herein preferably comprise a window or transparent region which extends along one or more edges of said security article. Particularly when the security article is rectangular, window or transparent region(s) preferably extend along one or both of the long edges of said security article, particularly wherein the security article is a banknote. Alternatively or additionally, window or transparent region(s) may extend along one or both of the short edges of a rectangular security article, particularly when the security article is a banknote. This is particularly advantageous because security articles comprising a window or transparent region which extends along one or more edges are more difficult to counterfeit.

Advantageously, the security articles disclosed herein may comprise one or more half-window region(s), defined as a portion of the printed film in which an opacification layer is present on the first surface of said film in the half-window region but absent on the second surface of said film in the half-window region. It will be appreciated that the presence of a half-window region requires an opacification layer to be present on at least a part of a surface of said security article. Printed information may be disposed on a half-window region on either the first or second surface of the film or both, and is preferably disposed on the second surface of the film.

In the present invention, it is preferred that none of said window region(s) or half-window region(s) comprises a feature which may be used as a means for verifying, enhancing and/or optically varying a security device provided on the security article or elsewhere. In particular, the security article disclosed herein preferably does not comprise a security device and verification means to inspect and/or verify said security device by bringing said verification means into register with said security device. Preferably, the authenticity of the security article disclosed herein is verifiable only by a device or means which is extrinsic to said security device According to a second aspect of the invention, there is provided a transparent film comprising a non-fibrous substrate layer of regenerated cellulose wherein said transparent film exhibits one or more, and preferably all, of the following properties:

(i) haze of no more than 10%, preferably no more than 5%, preferably no more than 4%, preferably no more than 2.5%;

(ii) birefringence of from about 400 to about 800 nm;

(iii) a surface energy of at least about 38 dynes, preferably at least about 40 dynes, preferably at least about 42 dynes, and preferably no more than from about 60 dynes; and (iv) a water vapour permeability in the range of from about 20 to about 40, preferably from about 25 to about 35, preferably from about 28 to about 32 $g/m^2/24$ hours at 25° C. and 75% relative humidity, and/or in the range of from about 110 to about 130, preferably from about 115 to about 125, preferably from about 118 to about 122 $g/m^2/24$ hours at 38° C. and 90% relative humidity.

The description of the transparent film in the context of the first aspect of the invention is equally applicable to the second aspect of the invention. It will therefore be appreciated that the preferred features of the first aspect of the invention in respect of the transparent film, the substrate layer of regenerated cellulose, the regenerated cellulose, and the method of making each of them, are equally applicable to the second aspect.

In particular, the second aspect of the invention preferably provides a transparent film comprising a non-fibrous substrate layer of regenerated cellulose and further comprising an ink-receptive layer on at least one surface of said substrate layer, preferably wherein said ink-receptive layer is as described hereinabove. Preferably, said ink-receptive layer further comprises a barrier material to reduce the water vapour permeability of the film preferably wherein the barrier material is polyvinylidenechloride (PVdC).

The invention claimed is:

1. A method of manufacturing a security article exhibiting printed information, comprising:

disposing an opacification layer on at least a portion of at least one surface of a transparent film comprising a non-fibrous substrate layer of regenerated cellulose;

wherein the transparent film is devoid of light-sensitive additives;

wherein said security article comprises one or more window region(s), wherein a window region is defined as a portion of the printed film in which said opacification layer is absent on both surfaces of said film;

wherein printed information and optionally one or more other security feature(s) is disposed on said transparent film, and wherein said transparent film exhibits one or more of the following properties:

(i) haze of no more than 10%;

(ii) birefringence of from about 400 to about 800 nm;

(iii) a surface energy of at least about 38 dynes; and (iv) a water vapour permeability in the range of from about 20 to about 40 $g/m^2/24$ hours at 25° C. and 75% relative humidity, and/or in the range of from about 110 to about 130 $g/m^2/24$ hours at 38° C. and 90% relative humidity.

2. The method of claim 1 wherein said transparent film further comprises an ink-receptive layer on at least one surface of said substrate layer; optionally said ink-receptive layer is a polymeric coating layer.

3. The method of claim 1, wherein said transparent film comprises a barrier material on one or both surfaces thereof to reduce the water vapour permeability of the film.

4. The method of claim 1 wherein (a) the transparent film is devoid of watermarks, light-sensitive additives, taggants, markers or other security features; and/or (b) said security article excludes an anti-static agent; and/or (c) said transparent film comprises an anti-blocking additive or a coating layer comprising an anti-blocking additive; and/or (d) said transparent film exhibits a haze of no more than 10%; and/or (e) said transparent film is coloured or dyed.

5. The method of claim 1 wherein the thickness of said transparent film is from about 10 to about 250 μm.

6. The method of claim 1 wherein said substrate layer of regenerated cellulose is an extruded non-fibrous layer of regenerated cellulose; and/or wherein said regenerated cellulose consists or consists essentially of linear chains of β(1→4) linked D-glucose units and/or is chemically identical to naturally occurring cellulose.

7. The method of claim 1 wherein said printed information comprises or consists of one or more of images, patterns and alphanumeric characters.

8. The method of claim 1 wherein said security article exhibits printed information on one or both surfaces of the film, and an opacification layer on one or both surfaces of the film which is disposed prior to the printing of said printed information.

9. The method of claim 1, comprising:

a. introducing into an offset printing device said transparent film comprising a non-fibrous substrate layer of regenerated cellulose;

b. disposing the opacification layer on the at least a portion of at least one surface of said film by a first offset printing step; and c. disposing printed information on at least a portion of said opacification layer by a second offset printing step.

10. The method of claim 9 wherein (i) the first offset printing step and the second offset printing step are performed in the same offset printing device; and/or (ii) wherein the manufacturing process of steps (a) to (c) is a reel-to-reel process in which a web of said transparent film is fed into said printing device, optionally wherein said manufacture further comprises, after step (c), the step of cutting the offset-printed film into sheets prior to the application of additional printed information and/or security features thereon.

11. The method of claim 1, comprising:

a. introducing into a printing device a discrete sheet of said transparent film comprising a non-fibrous substrate layer of regenerated cellulose;

b. disposing the opacification layer on the at least a portion of at least one surface of said film by a first printing step; and c. disposing printed information on at least a portion of said opacification layer by a second printing step wherein said second printing step is an offset printing step.

12. The method of claim 11 wherein said first printing step is selected from screen printing and offset printing.

13. The method of claim 8 wherein (a) a printed opacification layer is disposed on at least a portion of each surface of said film; and/or (b) wherein no more than 90%, or no more than 80%, or no more than 70%, or no more than 60% of a surface of said film is printed with an opacification layer; and/or (c) wherein a surface of said security article exhibits one or more opacified portion(s) on which a printed opacification layer is disposed on said transparent film, and further exhibits one or more non-opacified portion(s) on which a printed opacification layer is not disposed on said transparent film, wherein printed information is disposed directly on one or more of said non-opacified portion(s); and/or (d) wherein the transmission optical density of the assembly comprising the film and opacification layer(s) is at least about 0.6 in the portion(s) where said opacification layer(s) is/are present; and/or (e) wherein said opacification layer comprises one or more opacifying and/or whitening agent(s); and/or (f) wherein an offset printing step is a simultaneous offset printing step which prints on each side of said film simultaneously.

14. The method of claim 9 further comprising (i) the step, after step (c), of disposing additional printed information on one or both surfaces of said offset-printed film, wherein said additional printed information is disposed by intaglio printing; and/or (ii) the step, after step (c), of disposing one or more security feature(s) on one or both surfaces of said offset-printed film; optionally said one or more security features are selected from additional alphanumeric information; optical security feature(s); and printed features comprising optically variable ink, magnetic ink and/or fluorescent ink; and/or (iii) the step, after step (c), of disposing a protective layer on one or both surfaces of said offset-printed film.

15. The method of claim 14 wherein said additional printed information and/or security features and/or protective layer are applied to a sheet of said offset-printed film, and wherein said method further comprises the step of cutting said sheets into a plurality of smaller pieces to provide a plurality of security articles.

16. The method of claim 1 wherein (a) said one or more window region(s) constitute at least 30% of the surface area of the printed film; and/or (b) wherein printed information is disposed on the window region on one or both surfaces of the film; and/or wherein a window region extends along one or more edges of said security article; and/or (c) wherein at least part of said window region is transparent; and/or (d) wherein none of said window region(s) comprises a feature which may be used as a means for verifying, enhancing and/or optically varying a security device provided on the security article or elsewhere.

17. The method of claim 1, wherein an opacification layer is present on at least one surface of said security article and wherein said security article comprises one or more half-window region(s), wherein a half-window region is defined as a portion of the printed film in which an opacification layer is present on the first surface of said film but absent on the second surface of said film in the half-window region.

18. The method of claim 1 wherein said security article is a banknote or security document.

19. The method of claim 1 wherein said security article does not comprise a security device and verification means to inspect and/or verify said security device by bringing said verification means into register with said security device; and/or wherein the authenticity of said security article is verifiable only by a device or means which is extrinsic to said security device.

20. A transparent film comprising a non-fibrous substrate layer of regenerated cellulose:

wherein an opacification layer is disposed on at least a portion of at least one surface of the transparent film and wherein a security article comprises one or more window region(s), wherein a window region is defined as a portion of the printed film in which said opacification layer is absent on both surfaces of said film;

wherein said transparent film is devoid of light-sensitive additives and wherein said transparent film exhibits one or more of the following properties:

(i) haze of no more than 10%;

(ii) birefringence of from about 400 to about 800 nm;

(iii) a surface energy of at least about 38 dynes; and (iv) a water vapour permeability in the range of from about 20 to about 40 $g/m^2/24$ hours at 25° C. and 75% relative humidity, and/or in the range of from about 110 to about 130 $g/m^2$/24 hours at 38° C. and 90% relative humidity.

21. A transparent film according to claim 20 wherein said transparent film does not contain an anti-static agent.

* * * * *